(12) United States Patent
Gurvich et al.

(10) Patent No.: US 11,892,035 B2
(45) Date of Patent: Feb. 6, 2024

(54) COMPOSITE/METAL JOINTS (71) Applicant: Hamilton Sundstrand Corporation, Charlotte, NC (US)

(72) Inventors: Mark R. Gurvich, Middletown, CT (US); Georgios S. Zafiris, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 257 days.

(21) Appl. No.: 17/238,571

(22) Filed: Apr. 23, 2021

(65) Prior Publication Data
US 2022/0341449 A1 Oct. 27, 2022

(51) Int. Cl.
*F16C 3/02* (2006.01)
*F16D 1/08* (2006.01)

(52) U.S. Cl.
CPC .............. *F16C 3/023* (2013.01); *F16C 3/026* (2013.01); *F16D 1/0894* (2013.01)

(58) Field of Classification Search
CPC .......... F16B 5/0258; F16B 5/04; F16B 7/042; F16B 19/02; F16B 19/08; F16B 19/1027; F16C 3/023; F16C 3/026; F16C 7/026; F16C 2326/06; F16D 1/02; F16D 1/06; F16D 1/0847; F16D 1/0894;
(Continued)

(56) References Cited

U.S. PATENT DOCUMENTS

| 3,584,473 A | 6/1971 | MacDonald |
| 3,603,626 A * | 9/1971 | Whiteside ................ F16B 5/02 411/57.1 |

(Continued)

FOREIGN PATENT DOCUMENTS

| DE | 102012223674 A1 * | 3/2014 | ........... F16D 1/0894 |
| EP | 0046869 A1 * | 3/1982 | .............. F16C 3/026 |

(Continued)

OTHER PUBLICATIONS

Extended European Search Report for EP Application No. 22167117.5, dated Oct. 4, 2022, 5 pages.

*Primary Examiner* — Josh Skroupa
(74) *Attorney, Agent, or Firm* — Kinney & Lange, P.A.

(57) ABSTRACT

A composite/metal joint includes a composite member, a metallic member, a cylindrical liner, and a fastener. The composite member has a first aperture. The metallic member is disposed adjacent to the composite member and has a second aperture coaxially aligned with the first aperture. The cylindrical liner extends longitudinally from a first end to a second end. The cylindrical liner has a cylindrical outer liner surface and a longitudinally extending third aperture coaxial with the first and second apertures and defined by an inner liner surface. The cylindrical liner is disposed in the first and second apertures with the outer liner surface adjacent to aperture walls of the first and second apertures. The cylindrical liner has a plurality of grooves intersecting the outer liner surface. The fastener is disposed through the third aperture of the cylindrical liner and is configured to attach the metallic member to the composite member. An outer surface of the fastener is in direct contact with the inner liner surface.

20 Claims, 6 Drawing Sheets

(58) Field of Classification Search
CPC ........... Y10T 403/4637; Y10T 403/553; Y10T 403/7075; Y10T 403/75
USPC .............................. 403/243, 294, 376, 408.1
See application file for complete search history.

(56) References Cited

U.S. PATENT DOCUMENTS

| | | | | |
|---|---|---|---|---|
| 4,185,472 | A * | 1/1980 | Yates | F16C 3/026 464/181 |
| 4,272,971 | A | 6/1981 | Loyd et al. | |
| 4,380,443 | A | 4/1983 | Federmann et al. | |
| 4,530,379 | A * | 7/1985 | Policelli | F16L 13/02 138/143 |
| 4,649,960 | A * | 3/1987 | Policelli | F16L 13/10 220/62.19 |
| 5,330,236 | A * | 7/1994 | Peterjohn | F16L 33/32 285/423 |
| 5,332,049 | A * | 7/1994 | Tew | E21B 17/1078 166/242.6 |
| 5,946,977 | A * | 9/1999 | Sato | F16D 1/0894 403/279 |
| 8,458,885 | B2 * | 6/2013 | Bianco | B29C 66/721 29/522.1 |
| 9,212,680 | B2 * | 12/2015 | Schneider | F16B 21/12 |
| 9,303,671 | B2 * | 4/2016 | Krajewski | F16B 19/04 |
| 9,303,682 | B2 * | 4/2016 | Sohl | F16C 3/026 |
| 9,644,669 | B2 * | 5/2017 | Griffiths | F16B 19/02 |
| 9,664,225 | B2 * | 5/2017 | Szczukowski | F16B 41/002 |
| 9,701,386 | B2 * | 7/2017 | Marovic | F16C 3/023 |
| 10,267,351 | B2 * | 4/2019 | Uhl | F16C 7/026 |
| 11,371,549 | B2 * | 6/2022 | Gurvich | F16C 3/023 |
| 11,448,566 | B2 * | 9/2022 | Gurvich | G01M 13/022 |
| 2020/0103351 | A1 | 4/2020 | Gurvich et al. | |
| 2023/0002039 | A1 * | 1/2023 | Gurvich | F16C 3/023 |

FOREIGN PATENT DOCUMENTS

| | | | | |
|---|---|---|---|---|
| FR | 2675563 | A1 * | 10/1992 | ............ F16L 47/00 |
| WO | 9748507 | A1 | 12/1997 | |
| WO | 2014037185 | A1 | 3/2014 | |
| WO | 2016186732 | A1 | 11/2016 | |

* cited by examiner

COMPOSITE/METAL JOINTS

BACKGROUND

The present disclosure relates generally to composite/metal joints and more particularly to joints for composite drive shafts used for heavy duty load transfer.

Figure 1A:
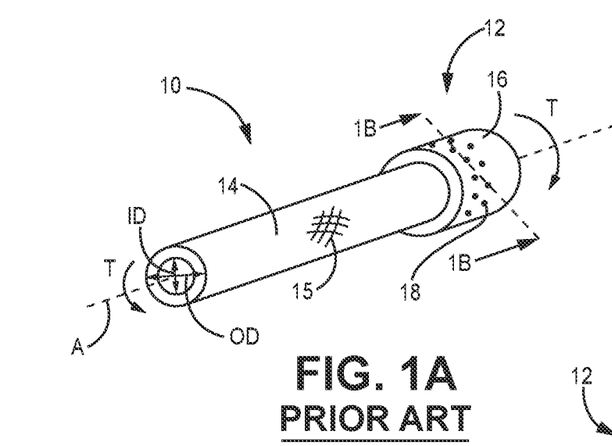
FIG. 1A is a perspective view of an end part of composite drive with a composite/metal joint as known in the prior art.
Figure 1B:
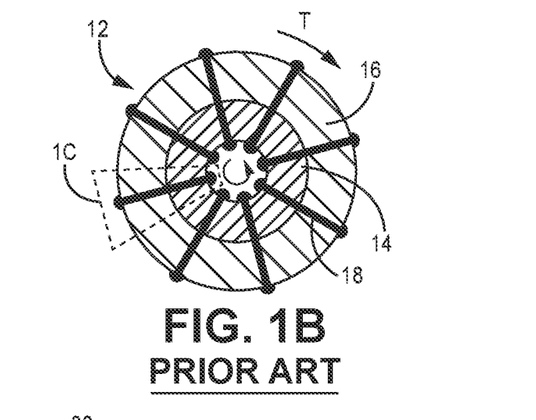
FIG. 1B is a diametric cross-sectional view of the composite/metal joint taken along line 1B-1B of FIG. 1A.
Figure 1C:
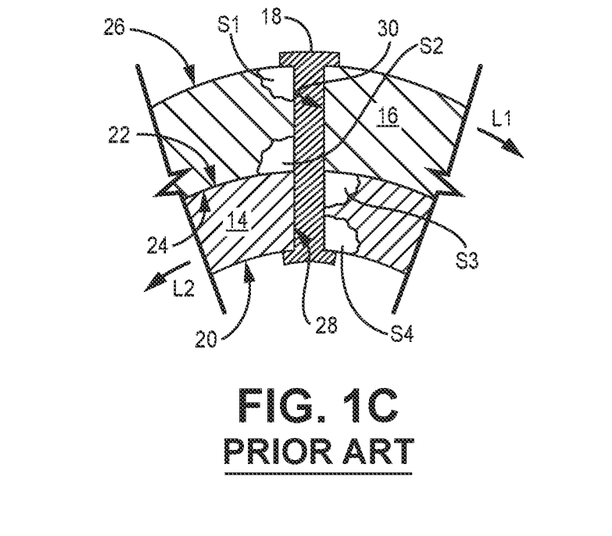
FIG. 1C is an enlarged view of portion 1C of FIG. 1B showing schematically shear stress concentrations.

Advanced composite materials, including fiber-reinforced polymer-matrix materials, have broadly been used in aircraft applications to provide high structural performance with significant weight reduction as compared to conventional metal structures. While composite materials provide significant advantages, there are still considerable challenges associated with their structural integrity and fabrication, particularly at composite/metal joints where the composite body is joined to a metallic body by fastener. This is a primary concern for composite drive shafts designed with thick walls to accommodate heavy duty torsional loads as illustrated in FIGS. 1A-1C. Torque is a prime load component for drive shafts, although other loads, such as bending moment and/or axial loads can be observed as well.

FIG. 1A shows a portion of drive shaft 10, composite/metal joint 12, composite shaft 14, metallic sleeve 16, and radial fasteners 18. FIG. 1B is a diametric cross-sectional view taken along the line 1B-1B of FIG. 1A. FIG. 1C is a close-up of a portion of the cross-sectional view of FIG. 1B. FIGS. 1A-1C are discussed together. Composite/metal joint 12 is formed by composite shaft 14, metallic sleeve 16, and radial fasteners 18. Composite shaft 14 is a tubular body having inner diameter surface 20 and outer diameter surface 22. Metallic sleeve 16 is a tubular body having inner diameter surface 24 and outer diameter surface 26. Composite shaft 14 is received in metallic sleeve 16 such that outer diameter surface 22 of composite shaft 14 is adjacent inner diameter surface 24 of metallic sleeve 16. Composite shaft 14 and metallic sleeve 16 are disposed concentrically about shaft axis A. Composite shaft 14 includes circumferentially spaced apertures 28. Metallic sleeve 16 includes circumferentially and axially spaced apertures 30. Apertures 28 and 30 are coaxially aligned to receive radial fasteners 18. Radial fasteners 18 are received in apertures 28 and 30 to secure metallic sleeve 16 to composite shaft 14.

Metallic sleeve 16 can be coupled to a drive element configured to apply a load in the form of torsional moment T to drive shaft 10. Radial fasteners 18 extend radially (transverse to axis A) through each of composite shaft 14 and metallic sleeve 16. Composite shaft 14 is designed with thick walls defined by a ratio of inner diameter ID to outer diameter OD equal to or less than 99%. As illustrated in FIGS. 1A and 1B, a torsional load applied to the metallic sleeve 16 produces a corresponding reaction in a form of torsional moment T in an opposite direction in a representative cross-section of composite shaft 14. The torsional load generates stress distributions, with dominant shear stresses in the diametric cross-section of the shaft walls as schematically shown in FIG. 1C. Fasteners 18 restrict mutual twist of metallic sleeve 16 and composite shaft 12. FIG. 1C shows orientation of such mutual movement L1 due to torque in the hoop direction in metallic sleeve 16 and similar orientation of movement L2 in an opposite direction in composite shaft 12. Under dominant torsional load, mutual twist is restricted by radial fasteners 18, and individual fasteners are themselves under dominant conditions of shear. Such load transfer is associated with significant through-thickness stress concentrations, particularly at corners of contact between fasteners 18, composite shaft 12, and metallic sleeve 16, as illustrated in FIG. 1C. FIG. 1C shows stress concentrations S1 and S2 in metallic sleeve 16 and stress concentrations S3 and S4 in composite shaft 14. Stress concentrations S1 and S2 are located adjacent to outer diameter surface 26 and inner diameter surface 24, respectively. Stress concentrations S3 and S4 are located adjacent to outer diameter surface 22 and inner diameter surface 20, respectively. Maximal stresses in these locations can be considerably greater than average stresses due to localized contact nature of load transfer. For shear stresses in the diametric cross-section, stress concentrations, defined as ratios of local stresses to average stresses, in these locations can be significantly higher than average stresses. For example, the stress concentration ratios in these locations can be greater than 1.1. In some examples, the stress concentration ratio can be as high as 1.5 or 2. In some other examples, the stress concentration ratio can be within 2 and 4. In contrast to metallic shafts, composite shafts are relatively weak under through-thickness shear, and such stress concentrations can be prime reasons of damage and overall failure upon increased load. Such stress concentrations are not limited to composite to metal joints in drive shafts but can also be present in other structures with composite-to-metal joints requiring strong load transfer between thick composite and metallic parts and where orientation of the dominant load is known. Typical examples of such joints can include connections of metallic and composite shells used in numerous aircraft and rotorcraft composite applications, e.g., among others, connections between composite and metal airframe components, skin/frame connections, and connections between interior composite and metal parts.

Therefore, a need exists for design enhancements to mitigate stress concentrations in composite to metal joints to reduce risk of damage and/or extend the lifetime of the part.

SUMMARY

A composite/metal joint includes a composite member, a metallic member, a cylindrical liner, and a fastener. The composite member has a first aperture. The metallic member is disposed adjacent to the composite member and has a second aperture coaxially aligned with the first aperture. The cylindrical liner extends longitudinally from a first end to a second end. The cylindrical liner has a cylindrical outer liner surface and a longitudinally extending third aperture coaxial with the first and second apertures and defined by an inner liner surface. The cylindrical liner is disposed in the first and second apertures with the outer liner surface adjacent to aperture walls of the first and second apertures. The cylindrical liner has a plurality of grooves intersecting the outer liner surface. The fastener is disposed through the third aperture of the cylindrical liner and is configured to attach the metallic member to the composite member. An outer surface of the fastener is in direct contact with the inner liner surface.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Stress concentrations in composite/metal joints can be mitigated by providing liners with certain proposed geometric embodiments around fasteners. As disclosed herein, fastener liners can be formed of a material softer than the composite part, in particular, in the shear direction to allow for local deformation and enhanced local load transfer. In some embodiments, grooves or cutouts can be provided to allocate space for such local deformation, making local load transfer much more uniformly distributed. The term "groove" is used to broadly cover partial or through-thickness cutouts in a liner. The term "groove" is not intended to denote any particular shape. Benefits of the disclosed fastener liners include, among others, either reduced risks of damage in the composite portion of the component (i.e., drive shaft), or increased life of service, or a potential reduction in the number of fasteners needed to secure the composite/metal joint, or all of the above.

Figure 2A:
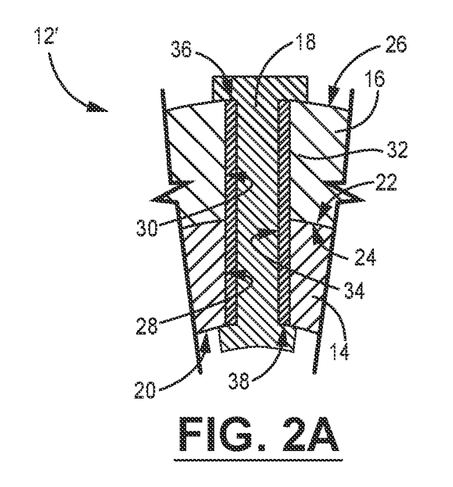
FIG. 2A is an enlarged diametric cross-sectional view of a segment of a composite/metal joint with one representative fastener including fastener liners.

FIG. 2A is an enlarged diametric cross-sectional view of a composite/metal joint of a composite drive shaft formed according to the prior art (FIG. 1A) but including proposed fastener liners. Composite/metallic joint 12', composite shaft 14, metallic sleeve 16, fastener 18, liner 32, apertures 28, 30, and 34, and ends 36, 38 are shown. Composite/metal joint 12' is formed by composite shaft 14, metallic sleeve 16, radial fasteners 18, and liner 32. Radial fasteners 18 secure metallic sleeve 16 to composite shaft 14. Radial fasteners can be rivets, bolts, or other fasteners typically applied for such connections. Radial fasteners are metallic, e.g., made of steel, titanium, high-strength alloys, etc. Composite shaft 14 and metallic sleeve 16 are disposed concentrically about shaft axis A (FIG. 1A). Radial fasteners 18 extend radially (with respect to axis A) through at least a portion of each of composite shaft 14 and metallic sleeve 16. Liners 32 are received in apertures 28 and 30. Liners 32 have aperture 34 and ends 36, 38. Fastener 18 is received in aperture 34.

As shown in FIG. 1A, drive shaft 10 can be configured to transmit heavy duty loads, mainly, torsional moment T, although some less critical bending and/or axial loads can be expected as well. For example, drive shaft 10 can be a part of an aircraft drive shaft system in a fixed-wing or rotary-wing aircraft (helicopter) to transmit engine torque. For a more specific example, drive shaft 10 can be used in a helicopter to transmit engine torque from a main rotor to a tail rotor. Other aircraft application examples could include shafts for actuation of aircraft control surfaces. In other examples, similar shafts can be used in automotive applications to transfer torque from engine and transmission device to a wheel system. Among other examples, similar designs of composite shafts can also be used in other transportation vehicles or stationary power system requiring reliable transfer of load, defined mainly by a dominant torsional moment. In all these and other similar examples, the heavy load can be associated with needs to have relatively thick walls of composite shafts. In general, a relatively broad range of composite/metal joints requiring predominantly shear load transfer through fastener connections can be considered as potential applications including, for example, rivet-type joints between metallic and composite shells or plates.

Composite shaft 14 is formed from a fiber-reinforced polymer-matrix composite material. Reinforced fibers can include, for example, carbon, glass, organic fibers or any of their combinations. Polymer matrices can include, for example, thermosets or thermoplastics. Such composite shafts can be fabricated using conventionally applied methods, for example, Automated Fiber Placing (AFP), filament-wounding, braiding, wrapping. Composite shaft 14 can include a plurality of continuous or discontinuous composite layers 15, arranged in laminated layups or other more complex arrangements, such as 3D reinforcements. For example, fibers in the plurality of layers can be oriented in one or more directions designed to provide greater torque-bearing capability or other expected combination of load components.

Composite shaft 14 can have relatively thick walls capable of transmitting heavy torsional loads. For example, a ratio of an inner diameter ID to an outer diameter OD (shown in FIG. 1A) of composite shaft 14 can be equal to or less than 99%. In some embodiments, the ratio of the inner diameter to outer diameter can be in a range of 90% to 99%. In other embodiments, for example, the ratio of the inner diameter to outer diameter can be in a range of 50% and 90%. The present disclosure is particularly directed to composite structures having thick walls with significantly non-uniform through-thickness distribution of stress concentrations, defined as ratios of local stresses to average stresses. For example, as illustrated in FIG. 1C, through-thickness distribution of shear stresses can be non-uniform with stress concentrations greatest at corners where composite shaft 14 and/or metallic sleeve 16 contacts fastener 18. Additional, fewer, and/or alternative stress concentrations may also exist in the composite shaft of a composite/metal joint 12', however, their impact on a risk of damage is usually less critical in case of dominant torsional load. It will be understood by one of ordinary skill in the art that the distributions of stresses and assessment of their concentrations depend on the application and can be determined through either analytical or computational predictions and/or testing.

Composite shaft 14 includes a plurality of apertures 28 configured to receive liners 32. Apertures 28 extend in a radial direction, with respect to axis A. Apertures 28 can extend through a full thickness of composite shaft 14, such that apertures 28 open to both inner and outer diameter surfaces 20, 22 of composite shaft 14. Apertures 28 can be cylindrical.

Metallic sleeve 16 is disposed adjacent to composite shaft 14. Metallic sleeve 16 can be coupled to outer diameter surface 22 of composite shaft 14, such that composite shaft 14 is received in metallic sleeve 16. In other embodiments, metallic sleeve 16 can be disposed on inner diameter surface 20 of composite shaft 14, such that metallic sleeve 16 is received in composite shaft 14. In yet other embodiments, metallic sleeve 16 can be disposed on both inner and outer diameter surfaces 20, 22 of composite shaft 14, such that composite shaft 14 is sandwiched between two metallic sleeves 16, as discussed further herein. Metallic sleeve 16 can be coupled to a drive element configured to apply a torsional load to the drive shaft 10.

Metallic sleeve 16 includes a plurality of apertures 30 configured to receive liners 32. Apertures 30 extend in a radial direction with respect to axis A. Apertures 30 can extend through a full thickness of metallic sleeve 16, such that apertures 30 open to both inner and outer diameter surfaces 24, 26 of metallic sleeve 16. Apertures 30 can be cylindrical.

Liners 32 are disposed in apertures 28 and 30. More specifically, liners 32 are disposed in the common aperture formed by apertures 28 and 30 and line apertures walls of composite shaft 14 and metallic liner 16, e.g., an outer surface of liner 32 is disposed adjacent to and can be in direct contact with walls of apertures 28 and 30. Liners 32 are configured to separate fastener 18 from aperture walls of composite shaft 14 and metallic shaft 16 and to deform under a local shear load transfer to mitigate stress concentrations in composite shaft 14. An inner surface of liner 32 can be in direct contact with an outer surface of fastener 18.

Additionally, liners 32 can provide a break in electric conductivity between fastener 18 and composite shaft 14 and metallic sleeve 16, and thereby enhance galvanic corrosion protection. Therefore, use of liners 32 can eliminate the need for coatings or paste traditionally applied around fasteners 18 to prevent galvanic corrosion.

Liners 32 can be formed of a material that is softer than composite shaft 14, particularly under trough-thickness shear in the circumferential direction. In the shear direction, material of the liner can be at least 5% softer than the corresponding composite material. In other embodiments, liner material can be similarly softer in a range of 5%-50%. In other examples, the liner material can be softer in a range of 50%-95% in comparison with the composite material. In some examples, materials of liner 32 can include polymers or polymeric compounds, polymers reinforced with short fibers, fabric or particulate materials. In other embodiments, materials of liner 32 can include different types of elastomers, rubber, silicon, or a thermoplastic polyurethane among others.

Liners 32 can have a shape matching a shape of apertures 28 and 30. Liners 32 can be cylindrical sleeves having ends 36, 38. Liners 32 extend longitudinally from end 36 to end 38. Liners 32 have aperture 34 configured to receive fastener 18. Aperture 34 can extend fully through liner 32 such that liner 32 is open on both ends 36, 38 to receive fastener 18 from either an inner diameter or outer diameter of composite metal joint 12'. Liners 32 can have a thickness t. The thickness t can vary based on the material properties of liner 32, composite shaft 14, and fastener 18, and geometrical parameters of the entire composite/metal joint, including thicknesses of composite and metallic walls, ID and OD, etc. Definition of the thickness t can also be affected by magnitudes of applied loads, primarily by the maximal expected value of torsional moment. Liner 32 can have a substantially constant thickness t or can have areas of localized reduced thickness. Liner 32 can also have local areas with zero thickness. Locations with reduced or zero thickness are due to introduced through-thickness grooves as discussed further herein.

Fasteners 18 are received in aperture 34 of liner 32. Fasteners 18 can extend fully through metallic liner 16 and composite shaft 14. In other embodiments, fasteners can extend fully through one of metallic sleeve 16, composite shaft 14 and through other metallic sleeve if applied (FIGS. 5C and 5E). Fasters 18 can be bolts, screws, pins, rivets, or similar fastening mechanisms known in the art.

Figure 2B:
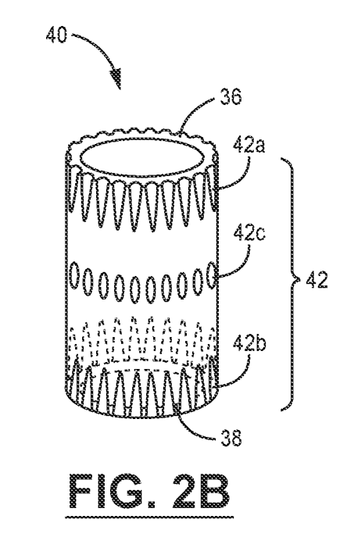
FIG. 2B is a perspective view of one embodiment of a fastener liner of FIG. 2A.
Figure 2C:
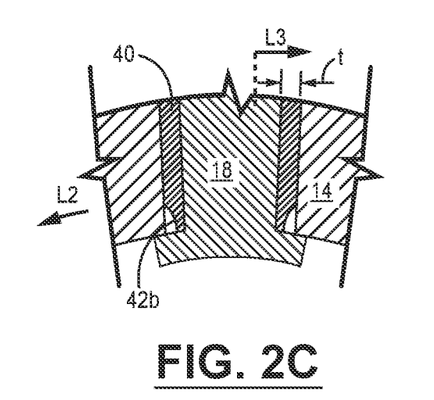
FIG. 2C is an enlarged diametric cross-sectional view of an edge section of the fastener liner of FIG. 2B assembled in a composite/metal joint.

FIG. 2B is a perspective view of liner 40, which represents one embodiment of liner 32 of FIG. 2A. FIG. 2C is an enlarged cross-sectional view the fastener liner of FIG. 2B assembled in composite/metal joint 12' of drive shaft 10. FIG. 2B shows liner 40, aperture 34, grooves 42, and ends 36, 38. FIG. 2C shows liner 40, grooves 42, composite shaft 14, and fastener 18.

Liner 40 is a cylindrical structure with aperture 34 open to both ends 36, 38 of liner 40. Liner 40 includes a plurality of grooves 42 disposed on an outer diameter surface, such that grooves 42 open to the outer diameter surface of liner 40. Grooves 42 cut into liner 40 providing localized areas of reduced thickness. When liner 40 is inserted in composite shaft 14 and metallic sleeve 16, grooves 42 provide a gap between aperture walls of composite shaft 14 and/or metallic sleeve 16 and liner 40. As illustrated in FIG. 2C, the aperture wall of composite shaft 14 is separated from liner 40 by a gap formed by groove 42 provided on the outer diameter surface of liner 40. Contact interaction between the composite shaft and the fastener is due to their mutual movement L2 and L3 as shown in FIG. 2C under applied torsional moment. This contact interaction is mitigated by available space in grooves 42b This space formed by grooves 42 make stress distribution at contact surfaces much more uniform, reduced stress concentrations and, therefore, significantly reduce a risk of local damage in these critical locations.

Grooves 42 can be preferentially located in locations of stress concentrations. As illustrated in FIG. 2B, a plurality of grooves 42 can be provided around liner 40 in a plurality of rings with each ring including a plurality of circumferentially aligned grooves 42 disposed around liner 40. Each ring of grooves 42 can be disposed in a location corresponding to a stress concentration, for example, as illustrated in FIG. 1C. FIG. 1C shows stress concentrations S1-S4 in metallic sleeve 14 and composite shaft 12 at corner contacts with faster 18. For example, stress concentrations are located adjacent outer diameter surface 26 of metallic sleeve 16 at a corner contact on a first side of fastener 18 (S1), adjacent the inner diameter of metallic sleeve 16 and outer diameter of composite shaft 14 at corner contacts on opposite first and second sides of fastener 18, respectively, where metallic sleeve 16 and composite shaft 14 meet (S2, S3), and adjacent the inner diameter of composite shaft 14 at a corner contact on the first side of fastener 18 (S4). As illustrated in FIG. 2B, grooves 42a are arranged in a first ring adjacent end 36 of liner 40, grooves 42b are arranged in a second ring adjacent to the opposite end 38 of liner 40, and grooves 42c are arranged in a third ring positioned between the first and second rings. The first ring of grooves 42a adjacent to end 36 of liner 40 or outer diameter boundary 26 corresponds to the stress concentration S1 in FIG. 1C at the outer diameter of metallic sleeve 14. The second ring of grooves 42b adjacent to end 38 of liner 40 or inner diameter boundary 20 corresponds to the location of the stress concentration S4 in FIG. 1C at the inner diameter of composite shaft 14. The third ring of grooves 42c disposed between the first and second rings on liner 40 corresponds to the location of the stress concentrations S2, S3 in FIG. 1C at the junction or interface between metallic sleeve 16 and composite shaft 14 (i.e., inner diameter of metallic sleeve 14 and outer diameter of composite shaft 14). Stresses in these locations can be considerably greater than average stresses due to localized load transfer. Therefore, stress concentrations in these locations can be much higher than average stresses.

As illustrated in FIG. 2B, grooves 42 can be disposed around a full circumference of liner 40 and uniformly spaced. In some examples, grooves 42 can extend partially around in the circumferential direction of liner 40 or can be unevenly spaced around liner 40. Grooves 42 can have a uniform size and shape. In other examples, grooves 42 can have a size and shape tailored to accommodate stress concentrations in particular locations or stress concentrations of varying magnitudes. For example, in liner 40 shown in FIG. 2B, grooves 42a, 42b and 42c can all be the same or different.

With respect to groove shapes at the outer surface of liners, different geometrical variants can be applied. For example, as illustrated in FIG. 2B, grooves 42c can have a substantially oval shape with a widest portion or largest cross-sectional width arranged between two narrowed ends, whereas grooves 42a and 42b can be a semi-oval shape with the widest portion of grooves 42a and 42b located at ends 36, 38, respectfully. Grooves 42a and 42b can be open to ends 36 and 38, respectively. The shape of grooves 42 is not limited to the shape disclosed. In other examples, grooves 42 can have any desired shape to accommodate contact deformation, limited only by manufacturing methods.

Figure 3A:
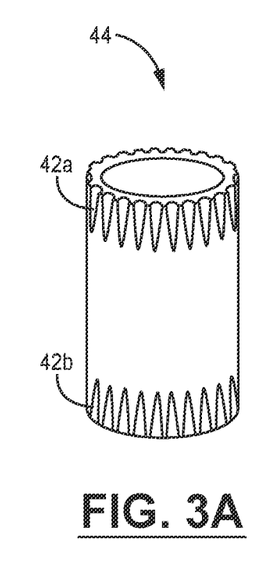
FIGS. 3A-3D are perspective views of other embodiments of the fastener liner of FIG. 2A.
Figure 3B:
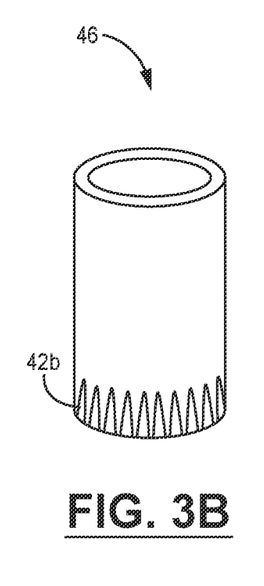
Figure 3C:
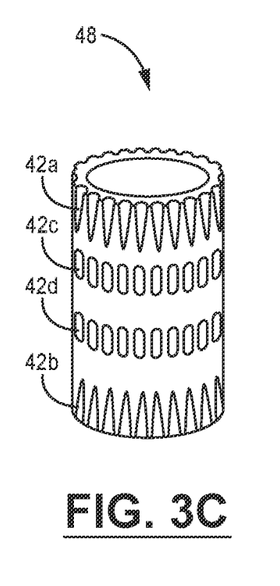
Figure 3D:
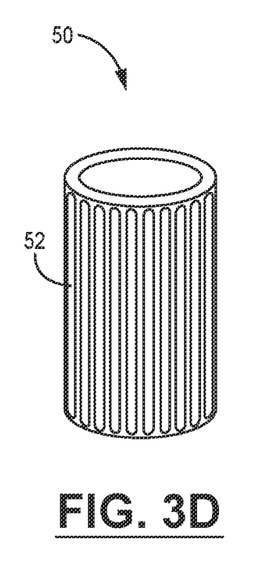

FIGS. 3A-3C show variants of liner 40 of FIG. 2B with different groove arrangements along the liner length. FIG. 3C shows variant liner 48 with several populations of grooves, e.g., 42a, 42b, 42c, and 42d, each of them arranged in the circumferential direction. FIG. 3A shows a specific variant liner 44 with populations of grooves 42a and 42b located only at both ends of the liner. FIG. 3B shows another variant liner 46 with populations of grooves 42b located only at one end of the liner. FIG. 3D shows another variant liner 50, where grooves 52 are distributed along the entire length of the liner.

FIGS. 3A-3D are discussed together. In these examples, grooves belonging to different populations (e.g., 42a, 42b, 42c and 42d) can be either the same or different. All grooves, including grooves 42 are disposed on an outer diameter surface of the liner, cutting into the liner to provide localized areas of reduced thickness, specifically arranged in regions of through-thickness boundaries and interfaces of composite shaft 14 and metallic sleeve 16 where stress concentrations S1-S4 are located. When liners 44, 46, 48, and 50 are inserted in composite shaft 14 and metallic sleeve 16, grooves 42a-42d and 42 provide a gap between aperture walls of composite shaft 14 and/or metallic sleeve 16 and the respective liner.

FIG. 3A shows liner 44 with grooves 42a and 42b. Liner 34 is substantially similar to liner 40 with grooves 42a positioned at end 36 and grooves 42b positioned at end 38. Liner 44 does not include a third ring of grooves (42c) arranged between grooves 42a and 42b. As described with respect to FIG. 2B, the positioning of grooves 42a and 42b can correspond to locations of stress concentrations shown in FIG. 1C. Specifically, the location of grooves 42a and 42b can correspond to stress concentrations S1 and S4 at corners of aperture 30 and outer diameter surface 26 of metallic sleeve 16 and aperture 28 and inner diameter surface 20 of composite shaft 14, respectively.

FIG. 3B shows liner 46 having only grooves 42b disposed at end 38. The location of grooves 42b can correspond to stress concentration S4 at a corner of aperture 28 and inner diameter surface 20 of composite shaft 14. The stress concentration in this location can be greatest and can, therefore, composite/metal joint 12' may benefit most from the additional space for deformation in this location. In some assemblies, it may be beneficial to insert liner 46 in an opposite orientation such that the grooves are positioned adjacent to outer diameter surface 26 of metallic sleeve 16 to mitigate stress concentration S1.

FIG. 3C shows liner 48 having grooves 42a-42c of liner 40 and a fourth ring of grooves 42d. Grooves 42d can be substantially the same as grooves 42c and can be positioned to correspond to interface locations between composite shaft 14 and metallic sleeve 16. For example, liner 48 can be designed for use with a composite/metal joint having a first metallic sleeve 16a disposed on outer diameter surface 22 of composite shaft 14 and a second metallic sleeve 16b disposed on inner diameter surface 20 of composite shaft 14 (shown in FIG. 5C). Grooves 42c can be located to span the region where the outer diameter of composite shaft 14 meets the inner diameter of the first metallic sleeve 16. Grooves 42d can be located to span the region where the inner diameter of composite shaft 14 meets the outer diameter of the second metallic sleeve. In this example grooves 42b correspond to a stress concentration at an inner diameter of the second metallic sleeve 16b located at a corner of the inner diameter surface and aperture of the second metallic sleeve.

FIG. 3D shows liner 50 with grooves 52. Grooves 52 are elongated in comparison to grooves 42. Grooves 52 can extend a full length of liner 50, such that grooves 50 are open to ends 36 and 38 or can extend substantially a full length of liner 50, such that the location of grooves 50 still correspond with stress concentrations S1 and S4 at both the inner diameter of composite shaft 14 and outer diameter metallic sleeve 16, respectively, as illustrated in FIG. 1C. Because grooves 52 span a length of liner 50, the location of grooves 52 also corresponds to stress concentrations S2 and S3 at the inner diameter of metallic sleeve 16 and outer diameter of composite shaft 14 as illustrated in FIG. 1C, as well as stress concentrations formed at the intersection of a second metallic sleeve and composite shaft 14, as described with respect to liner 48 of FIG. 3C. Liner 50 can be used for multiple composite/metal joint constructions, including joints having a single metallic sleeve disposed on the inner or outer diameter of composite shaft 14 or two metallic sleeves disposed on the inner diameter and outer diameter of composite shaft 14.

Liners 44, 46, and 48 provide grooves at locations of highest stress concentrations. Liners 46 and 48 are designed to provide grooves only where needed. In these embodiments, grooves can be located to correspond to locations of identified stress concentrations. However, liner 50 provides grooves along the entire length of 50 liner. An advantage of liner 50 shown in FIG. 3D is potential cost reduction during its fabrication and broader applicability to a range of joints with different wall thicknesses.

Although the grooves illustrated in FIGS. 2B and 3A-3D are disposed around a full circumference of the liners, grooves can be disposed in any location of the liner corresponding to a stress concentration in the composite/metallic joint and may not be required around a full circumference of the liner. Additionally, grooves on a single liner can have varying positioning, lengths, and shapes designed to accommodate expected load conditions. Their specific geometrical parameters can be defined during the design optimization by applying either computational (e.g., finite-element method) or analytical techniques to predict stress distributions.

Figure 4A:
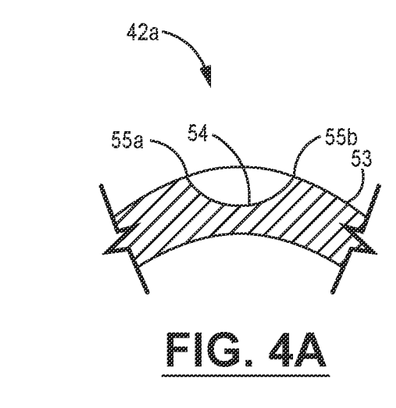
FIGS. 4A-4F are diametric, with respect to the liner, cross-sectional views of fastener liner groove geometries.
Figure 4B:
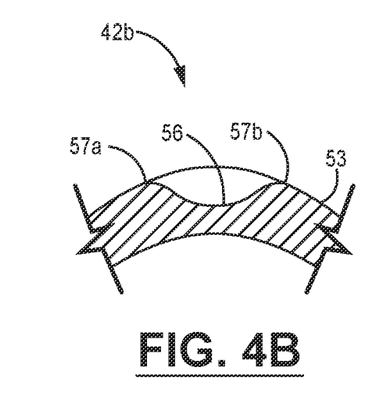
Figure 4C:
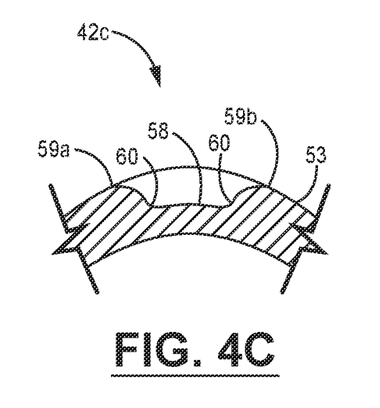
Figure 4D:
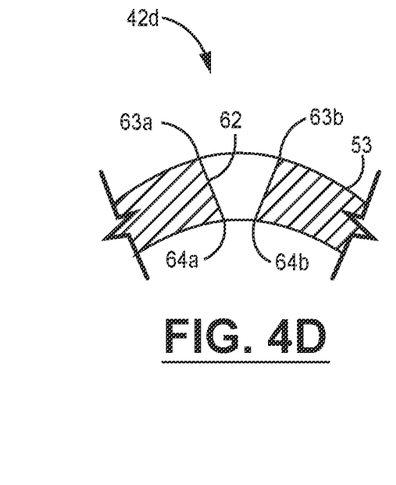
Figure 4E:
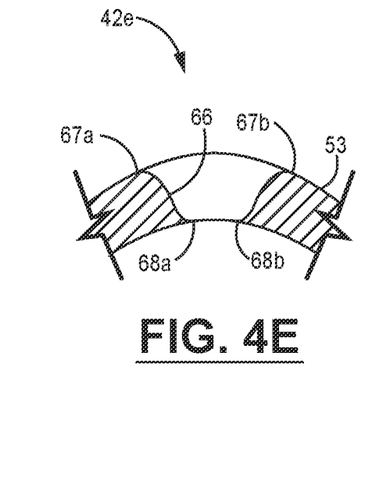
Figure 4F:
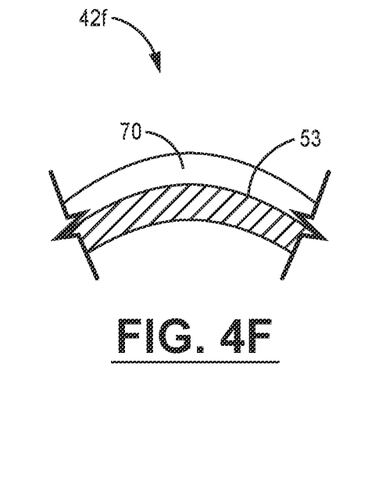

FIGS. 4A-4F are cross-sectional views of variants of groove geometries in liner 42. The cross-section is taken in a diametric plane transverse to the liner axis. As assembled, an inner diameter surface defining aperture 34 of liner 42 is positioned adjacent fastener 18 and outer diameter surface 53 is positioned adjacent composite shaft 14. FIG. 4A liner 42a with groove 54 and edges 55; FIG. 4B shows liner 42b with groove 56 and edges 57; FIG. 4C shows liner 42c with groove 58, edges 59, and corners 60; FIG. 4D shows liner 42d with groove 62 and edges 63 and 64; FIG. 4E shows liner 42e with groove 66 and edges 67 and 68; and FIG. 4F shows liner 42f with groove 70. Any of the disclosed liners can include any of the disclosed groove geometries.

FIG. 4A shows liner 42a having outer diameter surface 53 and groove 54 with edges 55. Groove 54 has a cross-sectional geometry with concave shape defined by a constant or variable positive curvature. Edges 55 are formed at outer diameter surface 53 of liner 42a. Edges 55 can be sharp corners. Groove 54 can extend a full or partial length of liner 42a.

FIG. 4B shows liner 42b having outer diameter surface 53 and groove 56 with edges 57. Groove 56 has a cross-sectional geometry with a shape having segments of both positive and negative curvatures and with rounded edges 57. Rounded edges 57 can provide a smoother transition of contact load transfer at outer diameter surface 53 of liner 42b with even smaller maximal stresses. Thus, the rounded edges can be used to enhance deformation and further minimize stress concentrations during operation. Groove 56 can extend a full or partial length of liner 42b.

FIG. 4C shows liner 42c having outer diameter surface 53 and groove 58 with edges 59 and corners 60. Groove 58 has a combination of convex and concave segments disposed between corners 60. For example, a curvature of the bottom portion of groove 58 can be similar to a curvature of the inner diameter of liner 42b. Edges 59 can be rounded to provide a smoother transition of contact load transfer at outer diameter surface 53 of liner 42c. The rounded edges can be used to enhance deformation and further minimize stress concentrations during operation. Groove 58 can extend a full or partial length of liner 42c.

FIG. 4D shows liner 42d having outer diameter surface 53 and groove 62 with edges 63 and 64. Groove 62 extends fully through the thickness of liner 42d forming an aperture through liner 42d. Edges 63 are formed at outer diameter surface 53 of liner 42d. Edges 64 are formed at the inner diameter surface of liner 42d. Edges 63 and 64 can be sharp corners. Groove 62 can have walls extending between edges 63 and 64 that are tapered inward toward the inner diameter of liner 42d, such that the widest opening is adjacent composite shaft 14 to allow for greatest deformation at the intersection of composite shaft 14 and liner 42d. Because groove 62 cuts fully through liner 42d, groove 62 can extend only a partial length of liner 42d.

FIG. 4E shows liner 42e having outer diameter surface 53 and groove 66 with edges 67 and 68. Groove 66 extends fully through the thickness of liner 42e forming an aperture through liner 42e. Edges 67 are formed at outer diameter surface 53 of liner 42. Edges 68 are formed at the inner diameter surface of liner 42e. Edges 67 and 68 can be rounded to provide a smooth transition of contact load transfer at the outer diameter surface and the inner diameter surface, respectively. The rounded edges can be used to enhance deformation and further minimize stress concentrations during operation. Groove 66 can have walls extending between edges 67 and 68 that are tapered inward toward the inner diameter of liner 42e, such that the widest opening is adjacent composite shaft 14 to allow for greatest deformation at the intersection of composite shaft 14 and liner 42e. Because groove 66 cuts fully through liner 42e, groove 66 can extend only a partial length of liner 42e.

FIG. 4F shows liner 42f having outer diameter surface 53 and groove 70. Groove 70 can extend circumferentially around liner 42f. Groove 70 can form a ring around liner 42f such that there are no edges in the circumferential direction. A width of groove 70 is in the length direction of liner 42f. Groove 70 can extend in width a partial length of liner 42f.

Figure 5A:
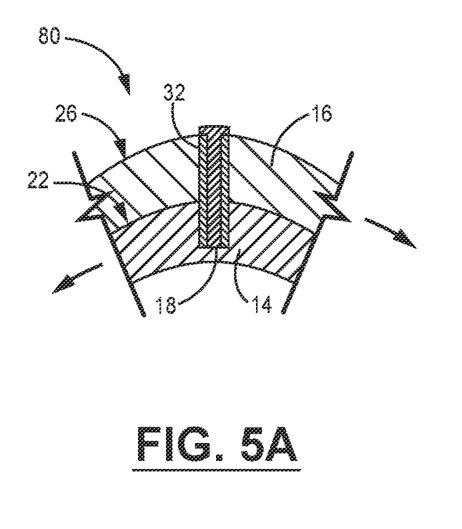
FIGS. 5A-5C are diametric cross-sectional views of different embodiments of composite/metal joints of a drive shaft.
Figure 5B:
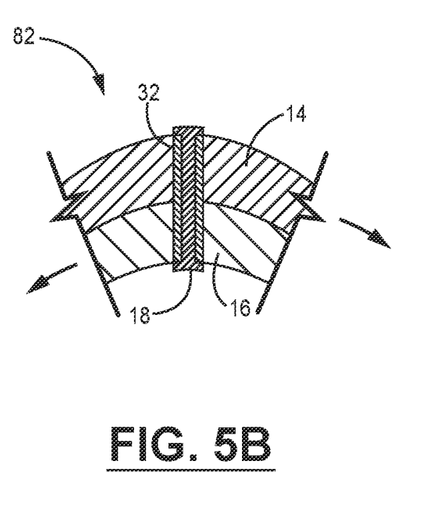
Figure 5C:
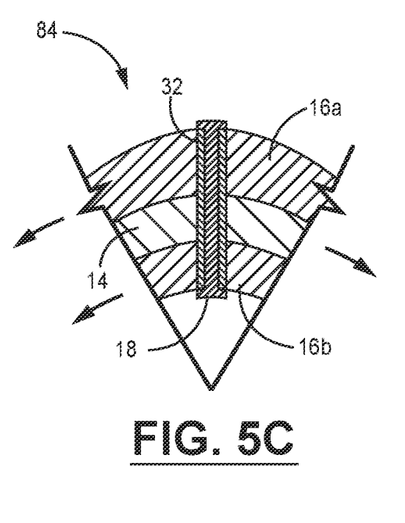

FIGS. 5A-5C are cross-sectional views of different embodiments of composite/metal joints of a drive shaft. FIG. 5A shows composite metal/joint 80 with composite shaft 14, metallic sleeve 16, fastener 18, and liner 32. FIG. 5B shows composite/metal joint 82 with composite shaft 14, metallic sleeve 16, fastener 18, and liner 32. FIG. 5C shows composite/metal joint 84 with composite shaft 14, metallic sleeves 16a and 16b, fastener 18, and liner 32. Composite shaft 14, metallic sleeve 16 (includes 16a and 16b), fastener 18, and liner 32 were described with respect to FIGS. 2A-2C. Liner 32 can be any of the liners disclosed herein or disclosed variations thereof. Arrows shown in FIGS. 5A-5C indicate a direction of mutual movement restricted by fastener when torsional load is applied to the drive shaft. FIGS. 5A-5C are discussed together.

FIG. 5A shows composite/metal joint 80. Composite/metal joint 80 is substantially similar to composite joint 12' described with respect to FIGS. 2A-2C with the exception that liner 32 and fastener 18 extends only partially through composite shaft 14. In composite/metal joint 80, composite shaft 14 is received in metallic sleeve 16. An aperture in composite shaft 14 extends through only a partial thickness of composite shaft 14 and opens to outer diameter surface 22 of composite shaft 14. Liner 32 and fastener 18 are received through outer diameter surface 26 of metallic sleeve 16 and extend fully through metallic sleeve 16 and into composite shaft 14. Aperture 28 of composite shaft 14 (shown in FIG. 2A) is closed at inner diameter surface 20, such that ends of fastener 18 and liner 32 is disposed in composite shaft 14. In other embodiments, fastener 18 and liner 32 can be received through the inner diameter of composite shaft 14 and can extend fully through composite shaft 14 and partially into metallic sleeve 16.

FIG. 5B shows composite/metal joint 82. In composite/metal joint 82, metallic sleeve 16 is received in composite shaft 14 such that metallic sleeve 16 is disposed on the inner diameter surface of composite shaft 14. Fastener 18 and liner 32 can extend fully through each of composite shaft 14 and metallic sleeve 16 or fully through one and partially into the other of composite shaft 14 and metallic sleeve 16 as described with respect to FIG. 5A.

FIG. 5C shows composite/metal joint 84. In composite/metal joint 84, composite shaft 14 is sandwiched between two metallic sleeves 16a and 16b. Metallic sleeve 16a receives composite shaft 14 on an inner diameter of metallic sleeve 16a. Composite shaft 14 receives metallic sleeve 16b on an inner diameter of composite shaft 14. Faster 18 and liner 32 can extend fully through each of metallic sleeves 16a and 16b or partially into one of metallic sleeves 16a and 16b as described with respect to FIG. 5A.

Figure 5D:
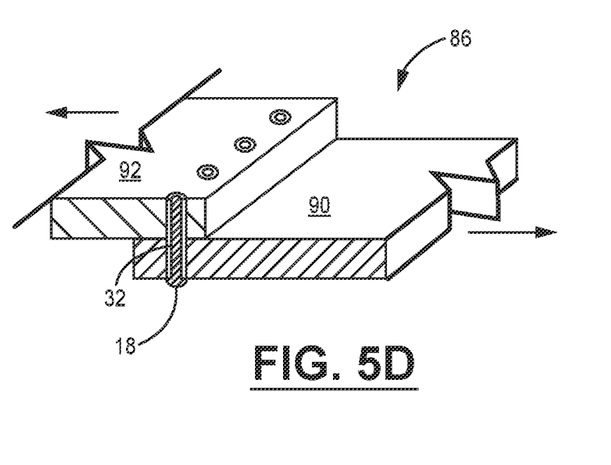
FIGS. 5D-5E are perspective views of different embodiments of composite/metal joints of planar or shell-type composite and metal members.
Figure 5E:
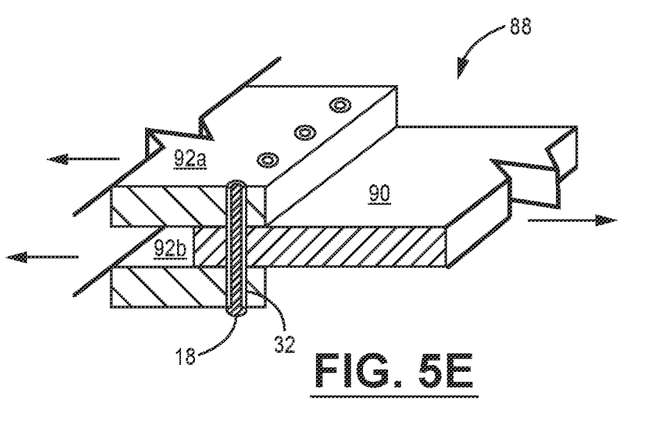

FIGS. 5D-5E are cross-sectional view of different embodiments of composite/metal joints 86 and 88 of composite and metal members 90 and 92 having shapes of panels or shelves at locations of joining. FIG. 5D shows composite/ metal joint 86, composite wall 90, metallic wall 92, fastener 18, and liner 32. FIG. 5E shows composite/metal joint 88, composite wall 90, metallic walls 92a and 92b, fastener 18, and liner 32. Composite wall 90 can be formed of any type of composite material subject to non-uniform through thickness stress concentrations and damage resultant of shear load. Metallic walls 92, 92a, and 92b can be formed of any type of metallic material. Metallic walls 92, 92a, and 92b can be susceptible to damage caused by shear load, although, typically to a lesser degree than composite wall 90. In some embodiments, composite wall 90 can be a composite shell body and metallic walls 92, 92a, and 92b can be metallic shells configured for form shells on outer or inner surfaces of the composite shell body 90. Fastener 18 and liner 32 were described with respect to FIGS. 2A-2C. Liner 32 can be any liner disclosed herein or any disclosed variation thereof. Arrows shown in FIGS. 5D and 5E indicate the direction of shear load.

FIG. 5D shows composite/metal joint 86. Composite/ metal joint 86 can be substantially the same as other composite/metal joints disclosed herein with the exception that composite/metal joint 86 is not subject to a torsional load. FIG. 5E shows composite/metal joint 88. Composite/metal joint 88 is substantially the same as composite/metal joint 86 with the addition of a second metallic wall 92b. In composite/metal joint 88, composite wall 90 is sandwiched between metallic walls 92a and 92b. Fasteners 18 can be used to secure composite and metallic walls in the same manner as described with respect to composite/metallic joints 80, 82, and 84.

Figure 6A:
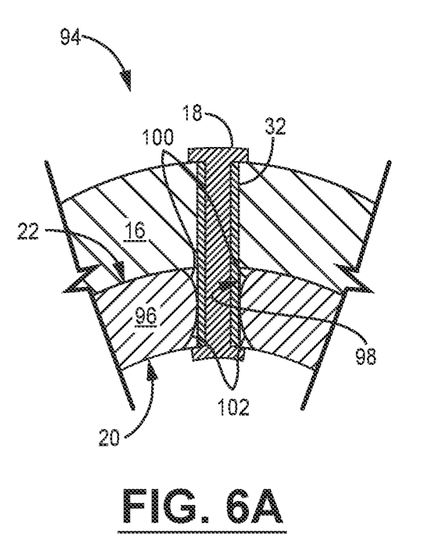
FIG. 6A is a diametric cross-sectional view of another embodiment of a composite/metal joint.
Figure 6B:
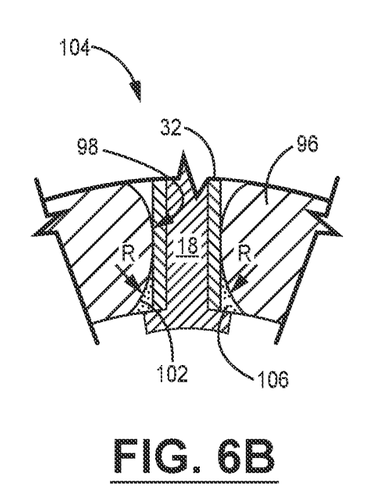
FIG. 6B is an enlarged diametric cross-sectional view of a variation of the composite/metal joint of FIG. 6A.

FIG. 6A is a cross-sectional view of another embodiment of a composite/metal joint of drive shaft 10. FIG. 6B is an enlarged cross-sectional view of a variation of the composite/metal joint of FIG. 6A. FIG. 6A shows composite/metal joint 94, composite shaft 96, inner diameter surface 20, outer diameter surface 22, aperture 98, rounded edges 100 and 102, fastener 18, and liner 32. FIG. 6B shows composite/ metal joint 104, composite shaft 96, rounded edges 102, filler material 106, fastener 18, and liner 32. Composite/ metal joints 94 and 104 are substantially the same as composite/metal joint 12' as described with respect to FIGS. 2A-2C with the exception of the shape of apertures 98 formed in composite shaft 96. Composite/metal joint 104 differs from composite/metal joint 94 in that composite/ metal joint 104 includes filler material 106.

As illustrated in FIG. 6A, composite shaft 96 can include aperture 98 configured to receive liner 32. Aperture 98 can have rounded corner edges 100 at outer diameter surface 22 and rounded corner edges 102 at inner diameter surface 20 of composite shaft 96. Rounded edges 100 and 102 can extend fully around the opening of aperture 98 at outer and inner diameter surfaces 22 and 20, respectively. In other embodiments, rounded edges can be provided substantially in the hoop direction alone or to a greater extent in the hoop direction where shear load is greatest. Rounded edges 100 and 102 can have a constant or variable radius R (shown in FIG. 6B). Here, specific geometrical definitions of radius R can be defined during design optimization based on predictive capabilities of stress distribution, e.g., by the finite element method. Such analysis can take into account material properties of considered components (composite, metal, filler), geometry of the joint and applied load conditions. Rounded edges 100 and 102 can be formed by machining composite shaft 96. Rounded edges 100 and 102 can provide a gap between composite shaft 96 and liner 32 fastener 18 to mitigate shear load on composite shaft 96 in areas that would otherwise have high stress concentrations. As such, when a torsional load is applied to metallic sleeve 16, movement of fastener 18 is accommodated by the gap formed by rounded edges 100 and 102.

FIG. 6B shows a variation of composite shaft 96. FIG. 6B is an enlarged cross-sectional view of a lower portion of composite shaft 96. As illustrated in FIG. 6B, the gap formed between rounded edges and liner 32 can be filled with a filler material 106. Filler material 106 can be, for example, a polymer or polymer reinforced with short fibers or particles, among other materials. Filler material 106 can be the same material as liner 32. In other embodiments, filler material can be a different material softer than liner 32. Filler material 106 can have a lower stiffness than composite shaft 96. A shear stiffness of the filler material is at least 5% lower than a shear stiffness of the composite member in a direction of the lowest composite stiffness. Filler material 106 can be selected to provide a required amount of deformation under shear load transfer. Filler material 106 can also reduce environmental infiltration into composite/metal joint 104 at the opening of aperture 98 at the inner diameter of composite shaft 96.

The disclosed liners and structures disclosed herein can mitigate stress concentrations in composite/metal joints. The disclosed liners and structures can reduce the risk of damage in the composite portion of the component (i.e., drive shaft), increase service life, protect against galvanic corrosion, and potentially, reduce a number of fasteners needed to secure the composite/metal joint.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A composite/metal joint includes a composite member, a metallic member, a cylindrical liner, and a fastener. The composite member has a first aperture. The metallic member is disposed adjacent to the composite member and has a second aperture coaxially aligned with the first aperture. The cylindrical liner extends longitudinally from a first end to a second end. The cylindrical liner has a cylindrical outer liner surface and a longitudinally extending third aperture coaxial with the first and second apertures and defined by an inner liner surface. The cylindrical liner is disposed in the first and second apertures with the outer liner surface adjacent to aperture walls of the first and second apertures. The cylindrical liner has a plurality of grooves intersecting the outer liner surface. The fastener is disposed through the third aperture of the cylindrical liner and is configured to attach the metallic member to the composite member. An outer surface of the fastener is in direct contact with the inner liner surface.

The composite/metal joint of the preceding paragraph can optionally include, additionally and/or alternatively, any one or more of the following features, configurations and/or additional components:

The composite/metal joint of the preceding paragraph, wherein the liner extends through of each of the composite member and the metallic member.

The composite/metal joint of the any of the preceding paragraphs, wherein at least one groove of the plurality of grooves is arranged in a location aligned with through-thickness boundaries of at least one of the composite member and the metallic member.

The composite/metal joint of the any of the preceding paragraphs, wherein at least one groove of the plurality of grooves extends from the first end of the cylindrical liner to the second end of the cylindrical liner, opposite the first end.

The composite/metal joint of the any of the preceding paragraphs, wherein grooves of the plurality of grooves are arranged circumferentially around the outer liner surface, and wherein the grooves are aligned with regions of through-thickness boundaries of at least one of the composite member and the metallic member.

The composite/metal joint of the any of the preceding paragraphs, wherein grooves of the plurality of grooves are longitudinally spaced between the first end and the second end of the cylindrical liner.

The composite/metal joint of the any of the preceding paragraphs, wherein the metallic member contacts the composite member at a through-thickness interface location, and wherein grooves of the plurality of grooves are arranged circumferentially around the outer liner surface in a region aligned with the through-thickness interface location.

The composite/metal joint of the any of the preceding paragraphs, wherein at least one groove of the plurality of grooves has curved edges with either uniform or variable radius at the outer liner surface in a diametric cross-section of the liner.

The composite/metal joint of the any of the preceding paragraphs, wherein at least one groove of the plurality of grooves wraps in the circumferential direction around the outer liner surface.

The composite/metal joint of the any of the preceding paragraphs, wherein at least one groove of the plurality of grooves extends through a full thickness of the cylindrical liner.

The composite/metal joint of the any of the preceding paragraphs, wherein the composite member is a cylindrical tubular drive shaft body.

The composite/metal joint of the any of the preceding paragraphs, wherein the metallic member forms a cylindrical tubular sleeve on one of an outer surface or an inner surface of the composite drive shaft.

The composite/metal joint of the any of the preceding paragraphs, wherein the metallic member is a first metallic member and wherein the composite/metal joint further comprises a second metallic member in a cylindrical tubular form, wherein the first metallic member forms a sleeve on an outer surface of the composite shaft and the second metallic member forms a sleeve on an inner surface of the composite shaft.

The composite/metal joint of the any of the preceding paragraphs, wherein the first aperture has an edge cavity in the circumferential direction with a curved shape in the axial cross-section of the first aperture with either uniform or variable radius such that the composite member is at least partially separated from the outer liner surface by a gap.

The composite/metal joint of the any of the preceding paragraphs, wherein the edge cavity is located at a region of a through-thickness boundary of at least one of the composite member and the metallic member.

The composite/metal joint of the any of the preceding paragraphs can further include a filler material disposed in the edge cavity formed between the curved edge and the liner.

The composite/metal joint of the any of the preceding paragraphs, wherein a shear stiffness of the filler material is at least 5% lower than a shear stiffness of the composite member in a direction of the lowest composite stiffness.

The composite/metal joint of the any of the preceding paragraphs, wherein the composite member is a shell body and wherein the metallic member forms a shell sleeve on one of an outer surface or an inner surface of the composite shell body.

The composite/metal joint of the any of the preceding paragraphs, wherein the metallic member is a first metallic member and wherein the composite/metal joint further comprises a second metallic member in a shell form, wherein the first metallic member forms a shell on an outer surface of the composite shell body and the second metallic member forms a shell on an inner surface of the composite shell body.

The composite/metal joint of the any of the preceding paragraphs, wherein shear stiffness of the cylindrical liner is at least 5% lower than the shear stiffness of the composite member in a direction of the lowest composite stiffness.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A composite/metal joint comprising:
a composite member having a first aperture;
a metallic member disposed adjacent to the composite member, the metallic member having a second aperture coaxially aligned with the first aperture;
a cylindrical liner extending longitudinally from a first end to a second end with a uniform outermost diameter, the cylindrical liner having a cylindrical outer liner surface and a longitudinally extending third aperture coaxial with the first and second apertures and defined by an inner liner surface, the cylindrical liner disposed in the first and second apertures with the outer liner surface adjacent to aperture walls of the first and second apertures, wherein the cylindrical liner has a plurality of grooves intersecting the outer liner surface, the plurality of grooves arranged in a location aligned with a through-thickness boundary of at least one of the composite member and the metallic member, wherein grooves of the plurality of grooves are circumferentially spaced about the outer liner surface and separated from adjacent grooves; and a fastener disposed through the third aperture of the cylindrical liner and configured to attach the metallic member to the composite member, wherein an outer surface of the fastener is in direct contact with the inner liner surface.

2. The composite/metal joint of claim 1, wherein the liner extends through a thickness of each of the composite member and the metallic member.

3. The composite/metal joint of claim 1, wherein at least one groove of the plurality of grooves extends from the first end of the cylindrical liner to the second end of the cylindrical liner, opposite the first end.

4. The composite/metal joint of claim 1, wherein the plurality of grooves comprises a first set of grooves and a second set of grooves, wherein the second set of grooves is longitudinally spaced from the first set of grooves.

5. The composite/metal joint of claim 1, wherein the metallic member contacts the composite member at a through-thickness interface location, and wherein grooves of the plurality of grooves are arranged circumferentially around the outer liner surface in a region aligned with the through-thickness interface location.

6. The composite/metal joint of claim 1, wherein at least one groove of the plurality of grooves has curved edges with either uniform or variable radius at the outer liner surface in a diametric cross-section of the liner.

7. The composite/metal joint of claim 1, and further comprising a circumferential groove that wraps in the circumferential direction around the outer liner surface.

8. The composite/metal joint of claim 1, wherein grooves of the plurality of grooves are longitudinally spaced between the first and the second end of the cylindrical liner and extend through a full thickness of the cylindrical liner.

9. The composite/metal joint of claim 1, wherein the composite member is a cylindrical tubular drive shaft body.

10. The composite/metal joint of claim 9, wherein the metallic member forms a cylindrical tubular sleeve on one of an outer surface or an inner surface of the composite drive shaft.

11. The composite/metal joint of claim 9, wherein the metallic member is a first metallic member and wherein the composite/metal joint further comprises a second metallic member in a cylindrical tubular form, wherein the first metallic member forms a sleeve on an outer surface of the composite shaft and the second metallic member forms a sleeve on an inner surface of the composite shaft.

12. The composite/metal joint of claim 1, wherein the first aperture has an edge cavity in the circumferential direction with a curved shape in the axial cross-section of the first aperture with either uniform or variable radius such that the composite member is at least partially separated from the outer liner surface by a gap.

13. The composite/metal joint of claim 12, wherein the edge cavity is located at an interface location wherein the metallic member contacts the composite member.

14. The composite/metal joint of claim 12 and further comprising a filler material disposed in the edge cavity formed between the curved edge and the liner.

15. The composite/metal joint of claim 14, wherein a shear stiffness of the filler material is at least 5% lower than a shear stiffness of the composite member in a direction of the lowest composite stiffness.

16. The composite/metal joint of claim 1, wherein the composite member is a shell body and wherein the metallic member forms a shell sleeve on one of an outer surface or an inner surface of the composite shell body.

17. The composite/metal joint of claim 16, wherein the metallic member is a first metallic member and wherein the composite/metal joint further comprises a second metallic member in a shell form, wherein the first metallic member forms a shell on an outer surface of the composite shell body and the second metallic member forms a shell on an inner surface of the composite shell body and, wherein the second metallic member comprises a fourth aperture coaxially aligned with the first and second apertures and the cylindrical liner is disposed in the fourth aperture.

18. The composite/metal joint of claim 1, wherein a shear stiffness of the cylindrical liner is at least 5% lower than the shear stiffness of the composite member in a direction of the lowest composite stiffness.

19. The composite/metal joint of claim 1, wherein grooves of the plurality of grooves have a concave shape.

20. The composite/metal joint of claim 1, wherein the grooves of the plurality of grooves have an oval or semi oval shape.

* * * * *